(12) United States Patent
Schmidt et al.

(10) Patent No.: US 8,869,815 B2
(45) Date of Patent: Oct. 28, 2014

(54) PINCH VALVE AND METHOD FOR MANUFACTURING SAME

(75) Inventors: Manuela Schmidt, Esslingen (DE); Jochen Rupp, Stuttgart (DE)

(73) Assignee: Robert Bosch GmbH, Stuttgart (DE)

(*) Notice: Subject to any disclaimer, the term of this patent is extended or adjusted under 35 U.S.C. 154(b) by 519 days.

(21) Appl. No.: 12/994,919

(22) PCT Filed: Apr. 23, 2009

(86) PCT No.: PCT/EP2009/054902
§ 371 (c)(1),
(2), (4) Date: Nov. 29, 2010

(87) PCT Pub. No.: WO2009/149986
PCT Pub. Date: Dec. 17, 2009

(65) Prior Publication Data
US 2011/0076204 A1    Mar. 31, 2011

(30) Foreign Application Priority Data
Jun. 10, 2008 (DE) .......................... 10 2008 002 336

(51) Int. Cl.
*F16K 31/12* (2006.01)
*F16K 99/00* (2006.01)
*F04B 43/12* (2006.01)

(52) U.S. Cl.
CPC ......... *F16K 99/0001* (2013.01); *F16K 99/0057* (2013.01); *F16K 99/0044* (2013.01); *F16K 99/0061* (2013.01); *F04B 43/12* (2013.01); *F16K 2099/0094* (2013.01); *F16K 99/0015* (2013.01); *F16K 2099/008* (2013.01); *F16K 99/0059* (2013.01)
USPC .......................... 137/15.19; 137/828; 137/833

(58) Field of Classification Search
CPC ............ F16K 99/0001; F16K 99/0059; F16K 99/0044; F16K 99/0061; F16K 2099/0073; F16K 2099/008
USPC ....................................... 137/828, 833, 15.19
See application file for complete search history.

(56) References Cited

U.S. PATENT DOCUMENTS

| 7,059,352 | B2 * | 6/2006 | Bohm ........................... 137/828 |
| 7,445,926 | B2 * | 11/2008 | Mathies et al. ............. 435/288.5 |
| 2003/0125429 | A1 * | 7/2003 | Joachimi et al. ............... 524/105 |
| 2006/0054228 | A1 * | 3/2006 | Unger et al. .................. 137/833 |
| 2006/0076068 | A1 | 4/2006 | Young et al. |
| 2006/0165372 | A1 | 7/2006 | Lee et al. |
| 2006/0272716 | A1 * | 12/2006 | Hawkins et al. ............... 137/833 |
| 2008/0187474 | A1 * | 8/2008 | Park et al. ..................... 422/292 |

FOREIGN PATENT DOCUMENTS

| EP | 1 065 378 | 1/2001 |
| EP | 1 844 936 | 10/2007 |
| EP | 1 905 514 | 4/2008 |
| WO | 2007/024829 | 3/2007 |

* cited by examiner

*Primary Examiner* — Stephen M Hepperle
*Assistant Examiner* — R. K. Arundale
(74) *Attorney, Agent, or Firm* — Kenyon & Kenyon LLP (57) ABSTRACT

A pinch valve, a chip including the pinch valve, a peristaltic pump including the pinch valve and a method for manufacturing the pinch valve. The pinch valve includes a first substrate, a second substrate, and a third substrate. The third substrate is formed from an elastic material and situated between the first and second substrates. The first substrate adjoins the third substrate and includes at least one first recess on the side adjacent to the third substrate. The second substrate adjoins the third substrate and includes at least one second recess on the side adjacent to the third substrate. The first recess and the second recess are situated at least partially opposite each other.

11 Claims, 4 Drawing Sheets

PINCH VALVE AND METHOD FOR MANUFACTURING SAME

FIELD OF THE INVENTION

The present invention relates to a pinch valve, a chip including a pinch valve of this type, a peristaltic pump including a pinch valve of this type and a method for manufacturing same.

BACKGROUND INFORMATION

Pinch valves are frequently used to manipulate fluids in microfluidic applications, in particular in biological applications. For example, the Fluidigm company uses valves of this type on fluidic chips under the name "Nanoflex." The fluidic chip and the valves located thereupon are made from an elastic solid material, for example polydimethylsiloxane. In particular, however, the manufacture of valves and chips of this type is complex and expensive, since numerous manufacturing steps are required. The valve and chip design options are also limited.

SUMMARY OF THE INVENTION

The pinch valve according to the present invention as described herein, the chip according to the present invention as described herein, the peristaltic pump according to the present invention as described herein and the method according to the present invention as described herein have the advantage that the manufacturing costs are low, in particular due to low material costs and a small number of method steps. Furthermore, a pinch valve and a method according to the present invention make it possible to use a plurality of materials in forming the third substrate, which makes it possible to optimize the functionality of the valve.

Further advantages and advantageous embodiments of the subject matter of the present invention are illustrated by the drawings and explained in the following description. It should be noted that the figures are only descriptive in nature and are not intended to limit the present invention in any way.

BRIEF DESCRIPTION OF THE DRAWINGS

FIG. 1b shows a schematic cross section along line B-B' of the first specific embodiment of a valve according to the present invention illustrated in FIG. 1a.

FIG. 2b shows a schematic cross section along line D-D' of the second specific embodiment of a valve according to the present invention illustrated in FIG. 2a.

FIG. 3b shows a schematic cross section along line F-F' of the third specific embodiment of a valve according to the present invention illustrated in FIG. 3a.

DETAILED DESCRIPTION

Figure 1A:
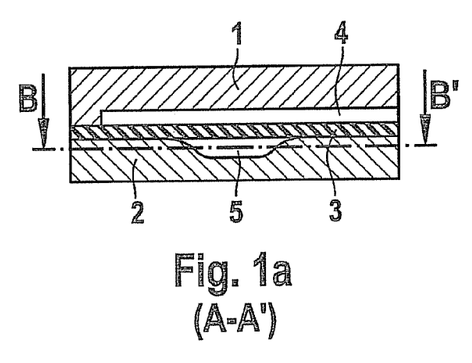
FIG. 1a shows a schematic cross section along line A-A' of a first specific embodiment of a valve according to the present invention in the open state.

FIG. 1a shows a schematic cross section along line A-A' of a first specific embodiment of a valve according to the present invention in the open state. As shown in FIG. 1a, the pinch valve according to the present invention includes a first substrate 1, a second substrate 2, and a third substrate 3. Third substrate 3 is formed from an elastic material and is situated, in particular in a sandwiched manner, between first substrate 1 and second substrate 2. First substrate 1 adjoins third substrate 3 and has at least one first recess 4 on the side adjacent to third substrate 3. Likewise, second substrate. 2 adjoins third substrate 3 and has at least one second recess 5 on the side adjacent to third substrate 3. In addition to the recesses illustrated in FIG. 1a, first substrate 1 and second substrate 2 may also have additional structures within the scope of the present invention. FIG. 1a shows that first recess 4 and second recess 5 are situated opposite each other. In other words, first recess 4 and second recess 5 overlap each other completely. Within the scope of the present invention, for example in the third specific embodiment shown in FIGS. 3a through 3c, it is, however, also possible for first recess 4 and second recess 5 to be situated only partially opposite each other, and to only partially overlap each other.

Figure 1B:
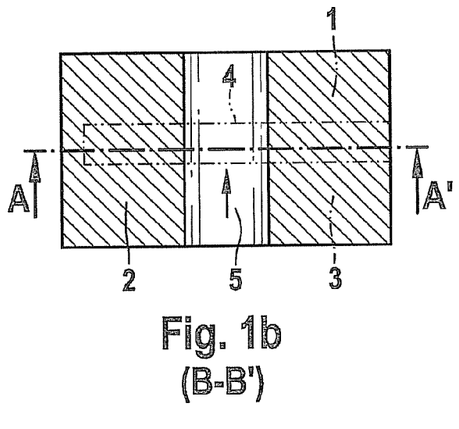

FIG. 1b shows a schematic cross section along line B-B' of the first specific embodiment of a valve according to the present invention illustrated in FIG. 1a. In FIG. 1b as well as in the cross sectional drawings 2b and 3c, elements and reference numerals situated above the sectional plane are illustrated by the broken line (dash and two dots). Like FIG. 2b, FIG. 1b shows that, within the scope of the first and second specific embodiments according to the present invention, the longitudinal axes of first recess 4 and second recess 5 are situated relative to each other at an angle of more than zero degrees, for example more than 20 degrees, in particular at a right angle.

The pinch valve according to the present invention is based on the principle that, upon application of different pressures in recesses 4, 5, the area situated between first recess 4 and second recess 5 of third, elastic substrate 3 may expand into recess 4, 5 having the lesser pressure. In the specific embodiments according to the present invention and illustrated in FIGS. 1a through 2c, the area of third, elastic substrate 3 situated between first recess 4 and second recess 5 expands into second recess 5, which may be, for example, a fluid channel, due to a pressure increase in first recess 4, which may also be referred to as the valve control channel, thereby constricting or closing second recess 5 or the fluid channel.

Figure 1C:
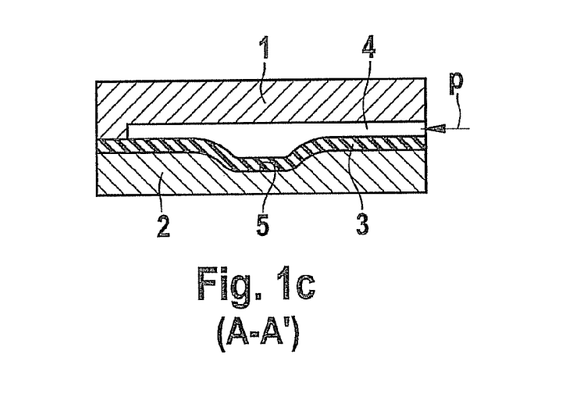
FIG. 1c shows a schematic cross section along line A-A' of the first specific embodiment of a valve according to the present invention illustrated in FIG. 1a, in the closed state.

Within the scope of the specific embodiments according to the present invention and illustrated in FIGS. 1a through 2c, the valve is a "normally on" valve, i.e., the pinch valve is normally open, for example under normal pressure in first recess 4, and the valve is activated, i.e., partially or completely closed, by a pressure increase in first recess 4, as illustrated in FIG. 1c.

Within the scope of the first specific embodiment of the present invention illustrated in FIGS. 1a through 1c, the pressure in first recess 4 is regulated by an external pressure device, i.e., for example by a pressure device situated outside substrates 1, 2, 3. This is shown in FIG. 1c by the arrow identified by reference symbol p.

In all its specific embodiments, the pinch valve according to the present invention may be a microfluidic pinch valve. Microfluidic means that the volume of manipulated fluid typically lies in the range of some 100 microliters to a few nanoliters. The cross-sectional area of second recess 5, in particular that of the fluid channel, may be ≤90,000 µm$^2$, for example ≤300 µm×300 µm, in particular ≤50 µm (height)× 100 µm (width). The area of third elastic substrate 3 situated between first recess 4 and second recess 5, in particular the area between the valve control channel and the fluid channel, may be ≤250,000 µm$^2$, for example ≤500 µm×500 µm. For example, the pinch valve according to the present invention may be a valve for a microfluidic chip, in particular a biochip.

Figure 2A:
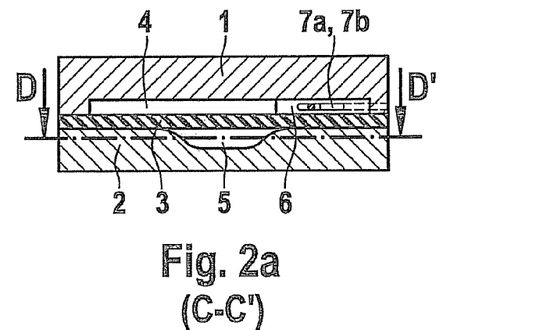
FIG. 2a shows a schematic cross section along line C-C' of a second specific embodiment of a valve according to the present invention in the open state.
Figure 2B:
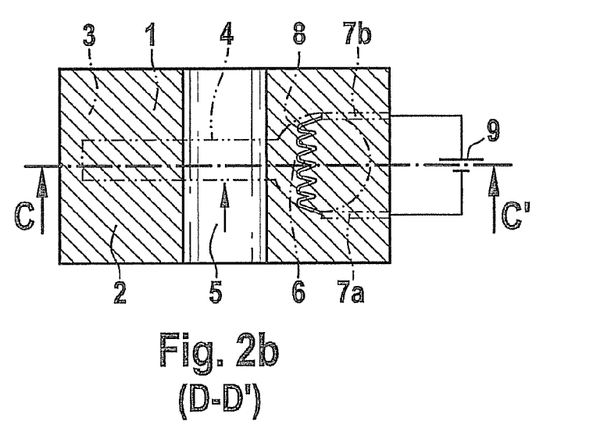
Figure 2C:
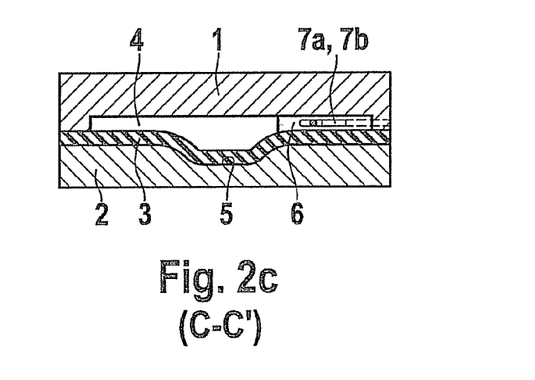
FIG. 2c shows a schematic cross section along line C-C' of the second specific embodiment of a valve according to the present invention illustrated in FIG. 2a, in the closed state.

FIGS. 2a and 2c show a schematic cross section along line C-C' of a second specific embodiment of a valve according to the present invention in the open state and in the closed state.

FIG. 2a shows that the second specific embodiment according to the present invention differs from the first specific embodiment in that first recess 4 is connected to an electrically heatable pressure chamber 6, which, in particular, is integrated into first substrate 1, in particular for opening and closing the valve, and first recess 4 is not connected to an external pressure device. Within the scope of this specific embodiment, in particular, first recess 4 and pressure chamber 6 together form a closed unit. This means that a gas-permeable and/or fluid-permeable connection of first recess 4 and/or pressure chamber 6 to an external unit, for example an external pressure device, is advantageously not required.

FIG. 2b shows a schematic cross section along line D-D' of the second specific embodiment of a valve according to the present invention illustrated in FIG. 2a. Within the scope of the present invention, electrically heatable pressure chamber 6 as well as first recess 4 may accommodate a gas and/or a fluid. For example, air, nitrogen, noble gases, water and/or oils are suitable for this purpose. FIG. 2b shows that a heating spiral 8 may be situated in pressure chamber 6 and connected to an external voltage and/or current supply device 9 via two conductor tracks 7a, 7b fed through first substrate 1.

Due to a structure of this type, a gas located in pressure chamber 6 and/or recess 4 and/or a fluid located in pressure chamber 6 and/or recess 4 may be heated, which causes the gas and/or the fluid to expand and thus the pressure in first recess 4 to increase. The pressure in first recess 4 may thus be regulated by electrically heatable pressure chamber 6.

A structure of this type is particularly advantageous, since the pressure in first recess 4 is electrically controllable, few peripheral elements are required, the pressure may be generated on-chip and, particularly in microsystems, a fast cycle between heating and cooling and thus between a pressure increase and a pressure decrease are achievable.

Figure 3A:
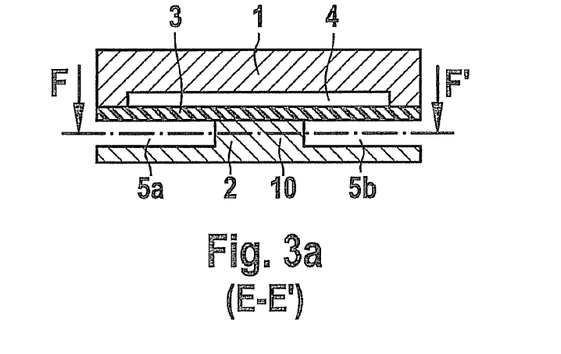
FIG. 3a shows a schematic cross section along line E-E' of a third specific embodiment of a valve according to the present invention in the closed state.
Figure 3B:
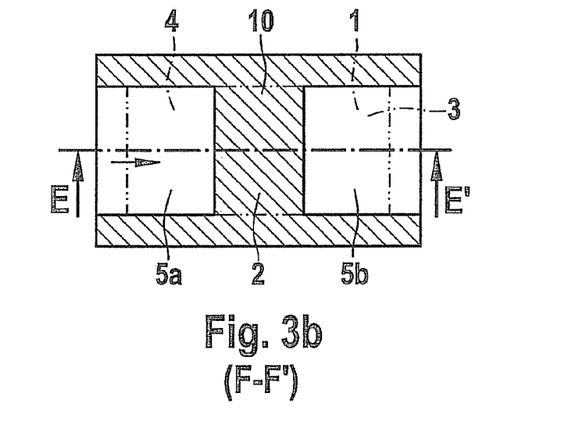
Figure 3C:
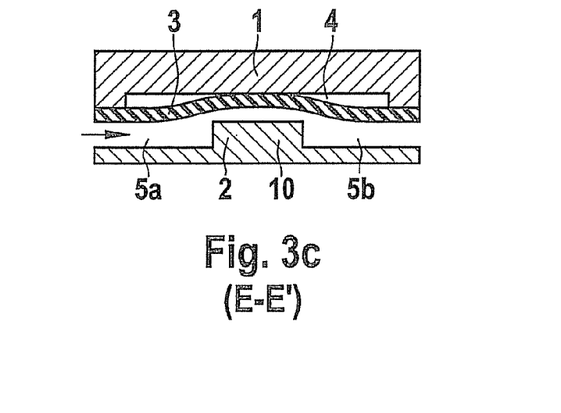
FIG. 3c shows a schematic cross section along line E-E' of the third specific embodiment of a valve according to the present invention illustrated in FIG. 3a, in the open state.

FIGS. 3a and 3c show a schematic cross section along line E-E' of a third specific embodiment of a valve according to the present invention in the closed state and in the open state. FIG. 3a shows that second substrate 2 has at least one third recess 5b which is situated next to second recess 5a on the side adjacent to third substrate 3, both second recess 5a and third recess 5b being situated at least partially opposite first recess 4. In other words, FIG. 3a shows that first recess 4 at least partially overlaps both second recess 5a and third recess 5b. Third recess 5b is separated from second recess 5a by a strip 10. FIGS. 3a through 3c further show that first recess 4 may be closed. This means that a gas-permeable and/or fluid-permeable connection to the outside is not necessarily required.

In contrast to the pinch valves in the first and second specific embodiments according to the present invention, the pinch valve in the third specific embodiment according to the present invention is a "normally off" valve. This means that the pinch valve in the third specific embodiment according to the present invention is normally closed, for example under normal pressure in first recess 4, and the pinch valve is activated or partially or completely opened by an external pressure device, due to a pressure increase in second recess 5a and/or third recess 5b, as shown in FIG. 3c.

"Normally off" valves are usually more complex to manufacture than "normally on" valves. On the other hand, a "normally off" valve according to the present invention and illustrated in FIGS. 3a through 3c has the advantage that it may be easily manufactured.

FIG. 3b shows a schematic cross section along line F-F' of the third specific embodiment of a valve according to the present invention illustrated in FIG. 3a. FIG. 3b shows that the longitudinal axes of first recess 4 within the scope of this specific embodiment are situated, for example largely parallel to the longitudinal axis of second recess 5a and largely parallel to the longitudinal axis of third recess 5b. This essentially means that deviations from the parallel state are accommodated insofar as this has no negative, effect on the valve function described by FIGS. 3a through 3c.

Within the scope of the present invention, third substrate 3 may be in the form of a layer, in particular an elastomer film. Third substrate 3, in particular the elastomer foil, may be expandable by ≥5%. For example, third substrate 3 may be an elastomer film having a film thickness of ≥0.01 µm to ≤100 µm, for example ≥0.1 µm to ≤50 µm, in particular ≥15 µm to ≤35 µm. Third substrate 3, or the material from which third substrate 3 is made, has a Young's modulus of ≥0.01 GPa to ≤0.1 GPa, in particular ≥0.05 GPa to ≤0.08 Gpa.

Within the scope of the present invention, third substrate 3 may be formed from a biocompatible material. Biocompatible means that the material enters into as few interactions as possible, in particular no interactions, in particular with biochemical analytes and samples. In particular, the material must enter into as few interactions as possible, in particular no interactions, in particular with biochemical analytes and samples which modify the specific properties required for the use of the analytes and samples.

Within the scope of the present invention, third substrate 3 may be formed from an, in particular, weldable thermoplastic elastomer as well as a non-thermoplastic elastomer.

Within the scope of a manufacturing method according to the present invention, based on a welding technique, third substrate 3 may be formed from a thermoplastic, in particular a weldable, elastomer. For example, olefin-based thermoplastic elastomers (TPE-O), urethane-based thermoplastic elastomers (TPE-U), polyester-based thermoplastic elastomers (TPE-E) or styrene-based thermoplastic elastomers (TPE-S) or mixtures thereof are suitable for forming third substrate 3.

The use of a welding technique and the employment of a weldable thermoplastic elastomer, in particular a thermoplastic elastomer film, have proven to be advantageous within the scope of the present invention, since the elastomer not only performs the valve functions, but also connects first substrate 1, second substrate 2, and third substrate 3 and also acts as a seal.

Within the scope of a manufacturing method according to the present invention and based on a thermal compression welding technique, the materials of first substrate 1, second substrate 2, and third substrate 3 may be selected in such a way that the melting temperature and/or softening temperature of third substrate 3 is lower than the melting temperature and/or softening temperature of first substrate 1 and second substrate 2. For example, the melting temperature and/or softening temperature of third substrate 3 may lie within a range of ≥50° C. to ≤200° C., for example ≥90° C. to ≤190° C., in particular ≥130° C. to ≤150° C., it being possible for the melting temperature and/or softening temperature of first substrate 1 and second substrate 2 to be, for example ≥5° C. to ≤40° C. higher than that of the third substrate, in particular ≥10° C. to ≤20° C. higher than that of the third substrate. The melting temperature and/or softening temperature of first substrate 1 and second substrate 2 may be, for example ≥100° C. or ≥150° C. or ≥200° C., in particular ≥130° C. or ≥230° C.

This advantageously ensures that structures, in particular microstructures in first substrate 1 and second substrate 2, are not modified or destroyed during joining.

Within the scope of a manufacturing method according to the present invention, based on a gluing technique, third substrate 3 may be formed from a non-thermoplastic elastomer. For example, silicones, polyurethanes, ethylene propylene diene monomer (EPDM) rubber, butadiene rubber, polyacrylate rubbers or styrene rubbers or mixtures thereof are suitable for this purpose.

Like third substrate 3, first substrate 1 and second substrate 2 may be made from a biocompatible material within the scope of the present invention.

In the same manner as third substrate 3 and independently of each other, first substrate 1 and second substrate 2 may be formed from an, in particular, weldable thermoplastic elastomer as well as a non-thermoplastic elastomer within the scope of the present invention.

Within the scope of a manufacturing method according to the present invention, based on a welding technique, first substrate 1 and second substrate 2 may be formed from a thermoplastic, in particular a weldable, elastomer, independently of each other. For example, polymers such as polyolefins, in particular polypropylenes (PP), polyethylenes (PE) or polystyrene (PS), polycarbonates (PC), Poly(meth)acrylates, in particular polymethyl methacrylate (PMMA), cyclic olefin copolymers (COC) or cyclic olefin polymers (COP) or mixtures thereof are suitable for forming first substrate 1 and second substrate 2. In particular, first substrate 1 and second substrate 2 may be formed independently of each other from a polycarbonate or cyclic olefin copolymer or a mixture thereof. These polymers have proven to be particularly advantageous within the scope of the present invention, since they are both biocompatible and thermoplastic and therefore weldable.

Within the scope of a manufacturing method according to the present invention, based on a gluing technique, first substrate 1 and second substrate 2 may, however, be formed from a non-thermoplastic elastomer, again independently of each other. For example, silicones, polyurethanes, ethylene propylene diene monomer (EPDM) rubber, butadiene rubber, polyacrylate rubbers or styrene rubbers or mixtures thereof are suitable for this purpose.

Within the scope of the present invention, first substrate 1 and second substrate 2 may be manufactured, for example by an injection molding or hot stamping method. Recesses 4, 5 located in first substrate 1 and second substrate 2 may also be manufactured during the course of the injection molding or hot stamping method. Furthermore, recesses 4, 5 may be formed later on in first substrate 1 and/or second substrate 2, using photolithography. Within the scope of the present invention, first substrate 1 and second substrate 2 may advantageously be manufactured using the same technology.

Within the scope of the present invention, first substrate 1 and second substrate 2 may be in the form of a layer. For example, first substrate 1 and second substrate 2 may, independently of each other, have a layer thickness of ≥1 µm to ≤2 mm, for example ≥10 µm to ≤50 µm, in particular ≥15 µm to ≤30 µm.

Within the scope of the present invention, and independently of each other, first recess 4, second recess 5, 5a and third recess 5b may have a cross-sectional area of ≤25 mm$^2$ (for example ≤5 mm×5 mm), or ≤250,000 mm$^2$ (for example ≤500 µm×500 µm), in particular ≤100 mm$^2$ (for example, ≤10 µm×10 µm).

With regard to further features and advantages of the valve according to the present invention, reference is hereby explicitly made to the description of the method according to the present invention.

A further subject matter of the present invention is a microfluidic chip, in particular a biochip, which includes at least one pinch valve according to the present invention. According to the present invention, the chip may be implemented in that first substrate 1, second substrate 2, and/or third substrate 3 includes further elements, such as further fluid channels and reagent chambers, in addition to the elements relevant to the valve function, in particular recesses 4, 5, 5a, 5b.

The present invention further relates to a peristaltic pump which includes at least one pinch valve according to the present invention. All of the at least three valves of the peristaltic pump may be pinch valves according to the present invention, and the peristaltic pump may also include one or more other valves.

For example, a peristaltic pump according to the present invention having three pinch valves according to the present invention may include a first substrate 1, a second substrate 2, and a third substrate 3, third substrate 3 being formed from an elastic material and situated between first substrate 1 and second substrate 2, first substrate 1 adjoining third substrate 3 and having at least one first recess 4, one fourth recess and one fifth recess on the side adjacent to third substrate 3, second substrate 2 adjoining third substrate 3 and having at least one second recess 5 on the side adjacent to third substrate 3, first recess 4, the fourth recess and the fifth recess being situated at least partially opposite second recess 5.

In a manner similar to the first specific embodiment according to the present invention, the fourth and/or fifth recess may be connected to an external pressure device, or in a manner similar to the second specific embodiment according to the present invention, the fourth and/or fifth recess may be connected to an electrically heatable pressure chamber. In a manner similar to the third specific embodiment according to the present invention, second substrate 2 may have at least one third recess 5b, sixth recess and seventh recess, which are situated next to second recess 5a in series on the side adjacent to third substrate 3, second recess 5a and third recess 5b being situated at least partially opposite first recess 4, third recess 5b and the sixth recess being situated at least partially opposite the fourth recess, the sixth and seventh recesses being situated at least partially opposite the fifth recess. Second recess 5a is separated from third recess 5b by a strip 10, two further strips being provided to separate the third recess from the sixth recess and to separate the sixth recess from the seventh recess.

With regard to further features and advantages, reference is hereby explicitly made to the description of the first, second and third specific embodiments of a valve according to the present invention.

Furthermore, the present invention relates to a method for manufacturing a pinch valve according to the present invention, a chip according to the present invention and/or a peristaltic pump according to the present invention, including the method steps:

providing a first substrate 1 and a second substrate 2, each having at least one recess 4, 5;
providing a third elastic substrate 3; and
connecting first substrate 1 to third substrate 3 and connecting third substrate 3 to second substrate 2.

A method of this type has, proven to be particularly advantageous within the scope of the present invention, since it requires no structuring of the third substrate, and an elastomer film may be easily used.

In particular, the method according to the present invention may include the following process step prior to the process step of joining: placing third substrate 3 between first substrate 1 and second substrate 2, in each case the sides of first substrate 1 and second substrate 2, which have at least one recess, adjoin third substrate 3.

As explained in connection with the description of the valve according to the present invention, within the scope of the present invention, first substrate 1 and second substrate 2 may be provided, for example, using an injection molding or hot stamping method, optionally in combination with photolithography.

For example, substrates 1, 2, 3 may be connected to each other within the scope of the method according to the present invention, using a welding and/or gluing technique, for example a lamination technique.

As explained above, third substrate 3 may be advantageously formed from an elastomer without a thermoplastic component, using a gluing technique.

In particular, substrates 1, 2, 3 may be connected to each other using thermal compression welding, laser beam welding and/or ultrasonic welding.

To carry out laser beam welding, first substrate 1 and/or second substrate 2 and/or third substrate 3 suitably has/have a black dye and/or another absorber, and or it has at least one joint line 11 made of a black dye and/or another absorber.

For example, substances which absorb a wavelength or a wavelength range which is used in laser beam welding are suitable as the "other absorber." Substances of this type are commercially available from the. BASF company under the brand name "Lumogen" and from the Clearweld company under the brand name "Clearweld."

To carry out laser beam welding, for example
first substrate 1 and third substrate 3 may be transparent, and second substrate 2 may include a black dye and/or another absorber; or
second substrate 2 and third substrate 3 may be transparent, and first substrate 1 may include a black dye and/or another absorber; or
first substrate 1 and second substrate 2 may be transparent, and third substrate 3 may include a black dye and/or another absorber; or
first substrate 1, second substrate 2 and third substrate 3 may be transparent, and first substrate 1 and/or second substrate 2 and/or third substrate 3 may have/has at least one joint line 11 made of a black dye and/or another absorber.

Within the scope of the present invention, however, it is also possible for two or more of substrates 1, 2, 3 to include a black dye and/or another absorber or to provide these substrates with at least one joint line 11 of this type.

The method according to the present invention may include at least one of the following method steps, in particular prior to placing the substrates: introducing a black dye and/or another absorber into a substrate 1, 2, 3, and/or printing at least one joint line 11 onto at least one substrate 1, 2, 3. Joint line 11 may be printed, for example, with the aid of a dispenser, with the aid of screen printing, or with the aid of an inkjet method.

Figure 4:
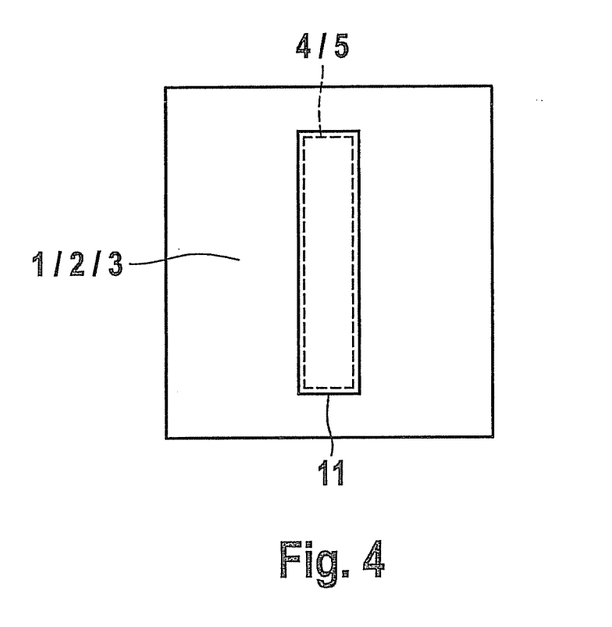
FIG. 4 shows a schematic top view of a first, second, or third substrate and illustrates the positioning of a joint line printed on the substrate with regard to a recess in the substrate or with regard to a recess in an overlying or underlying substrate.

Within the scope of a specific embodiment of the present invention, joint line(s) 11 is/are printed on the side of first substrate 1 and/or second substrate 2 adjacent to third substrate 3 in such a way that the joint line(s) partially or fully surround(s) the recess opening adjacent thereto; and/or joint line(s) 11 is/are printed on at least one side of third substrate 3 adjacent to first substrate 1 or second substrate 2 in such a way that joint line(s) 11 partially or completely surround(s) the recess opening(s) in a neighboring adjacent substrate 2, 3 and is/are adjacent thereto. FIG. 4 shows a method for placing a joint line 11 of this type printed on the substrate in relation to a recess in an overlying or underlying substrate.

Within the scope of the present invention, laser beam welding has proven to be advantageous, compared to thermal compression welding, since not all components to be joined are completely heated, but only the areas to be welded are heated and melted at points on the joining plane. As a result, sensitive microstructures are not heated and/or deformed. Likewise, third substrate 3, in particular the elastomer film, is not subjected to thermal stress and deformed over its entire surface, which could also impair the later valve functionality. Among other things, third substrate 3, in particular the thermoplastic elastomer film, may have a similar or even a slightly higher melting point and/or softening point as the material of structured first substrate 1 and second substrate 2. Furthermore, weld seams may be selectively provided, which increases the design options. Prior to connecting substrates 1, 2, 3, heat-sensitive reagents such as enzymes and antibodies may also be introduced into the channels without the reagents being destroyed by heating the entire assembly during the welding process.

Within the scope of a specific embodiment, the method according to the present invention therefore includes the following method step, in particular prior to connecting the substrates: introducing at least one, in particular heat sensitive, reagent into at least one recess, in particular into a recess 5, 5a, 5b in the second substrate.

Figure 5:
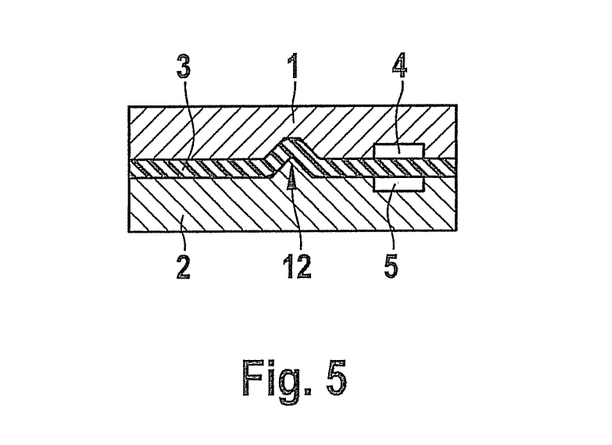
FIG. 5 shows a director structure for manufacturing a valve or a chip using ultrasonic welding.

To carry out ultrasonic welding, first substrate 1 and/or second substrate 2 and/or third substrate 3 suitably has/have at least one director structure 12, in particular an energy director structure 12. FIG. 5 shows a director structure 12 of this type in first substrate 1 and second substrate 2 of a pinch valve according to the present invention. FIG. 5 shows that third substrate 3 is pinched between first substrate 1 and the second substrate and it is also welded at the points where the director structure is located. A director structure 12 of this type may be introduced into first substrate 1 and second substrate 2 using an injection molding or hot stamping method and/or by photolithography.

Within the scope of the present invention, ultrasonic welding has also proven to be advantageous, compared to thermal compression welding, since not all components to be joined are completely heated, but are heated only on the joining plane. Furthermore, ultrasonic welding is advantageously a highly suitable method having very short clock cycles. Compared to laser beam welding, it has the further advantage that all components to be joined may be transparent and free of absorber.

With regard to further process engineering features and advantages, reference is hereby explicitly made to the description of the valve according to the present invention.

Finally, the present invention relates to the use of a valve according to the present invention, a chip according to the present invention and/or a pump according to the present invention in microfluidic, in particular pressure-driven, systems; for opening and closing channels, in particular in 2½D structures; for modifying the fluidic resistance, in particular by local setting of the channel cross section; as a peristaltic pump using three series-connected valves which are periodically opened and closed; for measuring fluid volumes, in particular via a defined spacing of the valves relative to each other; and/or for mixing fluids.

What is claimed is:

1. A method for manufacturing a pinch valve, the method comprising:
    providing a first substrate and a second substrate, each having at least one recess;
    providing a third elastic substrate;
    connecting the first substrate to the third substrate and connecting the third substrate to the second substrate;
    wherein the pinch valve is a microfluidic pinch valve, which includes:
        the first substrate;
        the second substrate; and
        the third substrate;
    wherein the third substrate is formed from an elastic material and is situated between the first substrate and the second substrate;
    wherein the first substrate adjoins the third substrate and has at least one first recess on a side of the first substrate that is adjacent to the third substrate;
    wherein the second substrate adjoins the third substrate and has at least one second recess on a side of the second substrate that is adjacent to the third substrate;
    wherein the first recess and the second recess are situated at least partially opposite each other;
    prior to connecting the third substrate to the first substrate and the second substrate, forming an energy director structure on at least one of the first substrate, the second substrate, and the third substrate; and
    using ultrasonic welding to connect the third substrate to the first and the second substrates, wherein each energy director structure pinches the third substrate between the first and the second substrates and causes the welding to occur at a location of the energy director structure.

2. A method for manufacturing a pinch valve, the method comprising:
    providing a first substrate and a second substrate, each having at least one recess;
    providing a third elastic substrate;
    connecting the first substrate to the third substrate and connecting the third substrate to the second substrate, wherein the third substrate is connected to the first substrate and the second substrate using laser beam welding, wherein at least one of the first substrate, the second substrate, and the third substrate includes at least one joint line made from at least one of a black dye and another absorber, the laser beam welding occurring at the at least one joint line, which joint line at least partially surrounds at least one of the first recess and the second recess;
    wherein the pinch valve is a microfluidic pinch valve, which includes:
        the first substrate;
        the second substrate; and
        the third substrate;
    wherein the third substrate is formed from an elastic material and is situated between the first substrate and the second substrate;
    wherein the first substrate adjoins the third substrate and has at least one first recess on a side of the first substrate that is adjacent to the third substrate;
    wherein the second substrate adjoins the third substrate and has at least one second recess on a side of the second substrate that is adjacent to the third substrate;
    wherein the first recess and the second recess are situated at least partially opposite each other; and
    printing the at least one joint line on at least one of:
        the side of the first substrate adjacent to the third substrate, and to at least partially surround the first recess;
        the side of the second substrate adjacent to the third substrate, and to at least partially surround the second recess;
        the side of the third substrate adjacent to the first substrate, and to at least partially surround the first recess; and
        the side of the third substrate adjacent to the second substrate, and to at least partially surround the second recess.

3. The method of claim 2, further comprising forming the pinch valve to be partially or completely closable or openable, by an external pressure device.

4. The method of claim 2, further comprising connecting the first recess to an electrically heatable pressure chamber, which is integrated into the first substrate.

5. The method of claim 4, further comprising:
    providing a heating spiral in the pressure chamber, and
    connecting the heating spiral to an external voltage and/or current supply device via two conductor tracks fed through the first substrate.

6. The method of claim 2, further comprising:
    forming, in the second substrate, at least one third recess which is situated next to the second recess on the side of the second substrate adjacent to the third substrate, and
    placing the second recess and the third recess at least partially opposite the first recess.

7. The method of claim 2, further comprising forming the third substrate from an elastomer film.

8. The method of claim 2, further comprising forming at least one of the first substrate, the second substrate and the third substrate from a thermoplastic elastomer.

9. The method of claim 2, further comprising:
    using thermal compression welding to connect the third substrate to the first and the second substrates, and
    selecting materials for the first, the second and the third substrate, such that at least one of a melting temperature and a softening temperature of the third substrate is lower than corresponding melting or softening temperatures of the first substrate and the second substrate.

10. The method of claim 2, wherein the third substrate is welded only around a perimeter of each recess.

11. A method for manufacturing a pinch valve, the method comprising:
    providing a first substrate and a second substrate, each having at least one recess;
    providing a third elastic substrate;
    connecting the first substrate to the third substrate and connecting the third substrate to the second substrate;

wherein the pinch valve is a microfluidic pinch valve, which includes:
  the first substrate;
  the second substrate; and
  the third substrate;
wherein the third substrate is formed from an elastic material and is situated between the first substrate and the second substrate;
wherein the first substrate adjoins the third substrate and has at least one first recess on a side of the first substrate that is adjacent to the third substrate;
wherein the second substrate adjoins the third substrate and has at least one second recess on a side of the second substrate that is adjacent to the third substrate;
wherein the first recess and the second recess are situated at least partially opposite each other; and
prior to connecting the third substrate to the first and the second substrates, introducing a heat-sensitive reagent into a channel formed by the second recess.

* * * * *